United States Patent [19]

Rosenbaum

[11] Patent Number: 5,098,202
[45] Date of Patent: Mar. 24, 1992

[54] MULTI-LAYER WEB OF FILM HAVING A GAS BARRIER

[75] Inventor: Larry A. Rosenbaum, Gurnee, Ill.

[73] Assignee: Baxter International Inc., Deerfield, Ill.

[21] Appl. No.: 350,372

[22] Filed: May 11, 1989

[51] Int. Cl.⁵ .................. B65D 33/16; B32B 27/08; A61B 19/00
[52] U.S. Cl. .................. 383/67; 428/215; 428/36.7; 428/483; 428/518; 428/520; 604/408; 383/113
[58] Field of Search ............... 428/518, 520, 483, 215, 428/414, 36.7; 604/403, 408; 383/109, 113, 67

[56] References Cited

U.S. PATENT DOCUMENTS

| 4,565,742 | 1/1986 | Lang | 428/518 |
| 4,788,105 | 11/1988 | Mueller et al. | 428/518 |
| 4,826,493 | 5/1989 | Martini et al. | 428/518 |

Primary Examiner—P. C. Sluby
Attorney, Agent, or Firm—Paul C. Flattery; Amy L. H. Rockwell; Paul E. Schaafsma

[57] ABSTRACT

A web of film capable of being constructed into a flexible container is provided. The web of film comprises: a first layer of polyester; a second layer of polyvinyl chloride that does not include a DEHP plasticizer or epoxidized oil; a third gas barrier layer; a fourth layer of polyvinyl chloride that does not include a plasticizer; and a fifth layer of polyester. A container made from the film is also provided.

20 Claims, 1 Drawing Sheet

MULTI-LAYER WEB OF FILM HAVING A GAS BARRIER

BACKGROUND OF THE INVENTION

The present invention relates generally to a thermoplastic web of film. More specifically, the present invention relates to a web of film, having a gas barrier, that can be utilized to make flexible containers.

Thermoplastic webs of film can be utilized to create flexible containers for housing products. These flexible containers are utilized, among other areas, in the medical industry for containing, inter alia, parenteral solutions such as intravenous solutions, dialysis solutions, frozen drugs, nutrition products, respiratory therapy products, and plasma. When these containers are utilized in the medical industry, because they will contain fluids or solids that are introduced into a patient's body, it is necessary for the containers to be: essentially transparent; flexible; essentially free of extractables; and capable of maintaining a product contained therein under sterile conditions until the product is accessed or removed from the flexible containers. The film from which these containers are constructed must also meet these requirements.

It is also important that the film used in constructing these containers is sufficiently strong so that the containers constructed from the film have sufficient strength. Furthermore, it is desirable, for economic reasons, that any such film be readily constructed into a flexible container on commercially available, or easily modified, production machinery.

As set forth above, because the web of film will be processed into a flexible container that houses a medical product that is introduced into a patient's body, it is necessary that the film structure does not contain chemicals that can be extracted by the medical product or are likely to pass with the medical product into the patient's body. This is especially critical with respect to the plasticizers utilized for making the web of film flexible. In this regard, it has been known to utilize polyvinyl chloride to make flexible containers. In order to make polyvinyl chloride sufficiently flexible, plasticizers have been added thereto. The toxicity of the plasticizers has been increasingly a matter of concern. Typically, diethylhexylphthalate (DEHP) and/or epoxidized oils are utilized as plasticizers for polyvinyl chloride. However, DEHP has become a suspect compound in that there is continued testing to determine if DEHP is a health hazard.

A further consideration in choosing a proper film for creating a flexible container is the product to be housed. In applications of the film to produce containers for products stored at ambient temperatures, it is desirable that the film provides a container with sufficient barrier properties. Without a sufficient barrier, water vapor, oxygen, and other gases and vapors may permeate the film deactivating or degrading the product contained therein. A web of film having a gas barrier for making flexible containers is disclosed in U.S. Pat. No. 4,692,361.

SUMMARY OF THE INVENTION

The present invention provides an improved web of film that includes a gas barrier. The web of film comprises: a first layer of polyester; a second layer of polyvinyl chloride that does not include a DEHP plasticizer or epoxidized oils; a third gas barrier layer; a fourth layer of polyvinyl chloride that does not contain a plasticizer; and a fifth layer of polyester.

In an embodiment of the present invention, the polyvinyl chloride layer includes an ethylene-vinyl acetate copolymer as a plasticizer.

In an embodiment of the present invention, the polyester layers include a polycyclohexanedimethylcyclohexane di-carboxylate elastomer.

In an embodiment of the present invention, the first layer has a thickness of approximately 0.00020 to about 0.0020 inches; the second layer has a thickness of approximately 0.0020 to about 0.0110 inches; the third layer has a thickness of approximately 0.0005 to about 0.004 inches; the fourth layer has a thickness of approximately 0.0020 to about 0.0110 inches; and the fifth layer has a thickness of approximately 0.0002 to about 0.0020 inches. In an embodiment, the web of film has an overall thickness of approximately 0.005 inches to about 0.03 inches.

In an embodiment of the present invention, the web of film is constructed so that at least the first, second, fourth, and fifth layers do not include DEHP plasticizers or epoxidized oil.

In an embodiment of the present invention, a web of film for producing flexible containers is provided comprising: a first layer of polyester; a second layer of polyvinyl chloride that does not include a DEHP plasticizer or epoxidized oil; a third layer of polyvinylidene chloride; a fourth layer of polyvinyl chloride that does not include a DEHP plasticizer or epoxidized oil; and a fifth layer of polyester.

In an embodiment of the present invention, a container having a body portion with opposed sealed walls forming a container, the walls being constructed from a web of film is provided. The web of film from which the container is constructed is a film such as that set forth above.

Accordingly, it is an advantage of the present invention to provide a multi-layer film that may be utilized to create a sterile flexible container.

Another advantage of the present invention is to provide a film structure that is sealable on its inside and outside layers.

A still further advantage of the present invention is that it provides a film that can be utilized to produce a container having a fitment sealed to the container.

An additional advantage of the present invention is that it provides a web of film that does not include a DEHP plasticizer in the polyvinyl chloride layer.

Another advantage of the present invention is that it provides a web of film that does not include, except in perhaps the gas barrier layer, epoxidized oil.

Moreover, an advantage of the present invention is that it provides a web of film that can be utilized on conventional packaging machinery to create flexible containers.

Still, an advantage of the present invention is that it provides a web of film that can be RF sealed.

Additionally, an advantage of the present invention is that it provides a web of film that can be utilized to produce a flexible bag that can house parenteral products including intravenous solutions, dialysis solutions, frozen drugs, nutrition products, respiratory therapy products, and plasma.

Another advantage of the present invention is that it provides a film that has a gas and vapor barrier.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a web of film having a gas barrier and capable of being manufactured into flexible containers. More specifically, the film structure of the present invention can be utilized to produce flexible containers capable of containing a fluid or solid to be maintained and removed under sterile conditions. These containers typically consist of a liquid containment body defined by sealed walls. In the medical industry, the containers are utilized to package, inter alia, parenteral products including intravenous solutions, dialysis solutions, frozen drugs, nutrition products, respiratory therapy products, and plasma.

Figure 1:
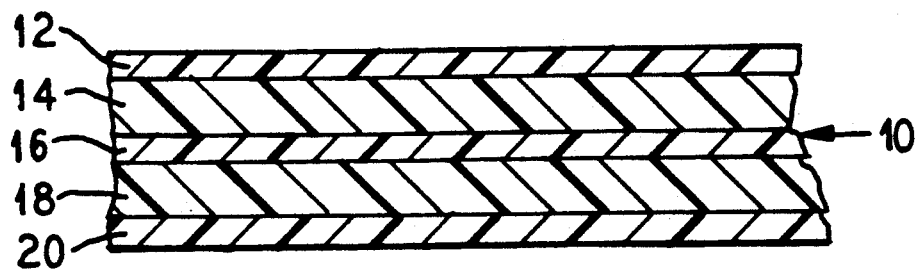
FIG. 1 illustrates a schematic cross-sectional view of an embodiment of the web of film of the present invention.

Referring to FIG. 1, a cross-sectional perspective view of a portion of a film structure 10 of an embodiment of the present invention is illustrated. The film structure includes five layers, 12, 14, 16, 18, and 20, respectively. The first layer 12 and fifth layer 20 are constructed from a polyester. In a preferred embodiment, the first and fifth layers, 12 and 20 respectively, are constructed from a polycyclohexane-dimethylcyclohexane di-carboxylate elastomer. A polyester available from Eastman Chemical Products, Inc., Kingsport, Tenn. 37662 under the name "PCCE Elastomeric Polyester" has been found to function satisfactorily in the present invention.

The second layer 14 and fourth layer 18 are constructed from a polyvinyl chloride material that does not include a DEHP plasticizer or epoxidized oil. In a preferred embodiment, the second and fourth layers, 14 and 18 respectively, are constructed from a polyvinyl chloride material that includes an ethylene-vinyl acetate copolymer. The ethylene-vinyl acetate copolymer functions as a plasticizer. A polyvinyl chloride film that does not include a DEHP plasticizer or epoxidized oil available from Sekisui America Corporation, 780 Third Avenue, Suite 3102, New york, N.Y. 10017, under the tradename "Esmedica V" has been found to function satisfactorily in the present invention.

The third layer 16 functions as a gas barrier layer. To this end, the third layer 16 is constructed from a material that is highly impermeable to water, oxygen, and other fluids and vapors. This allows the web of film 10 to be utilized to create flexible containers that can house products that are maintained or stored at temperatures above 0° C. In this regard, the web of film 10 can be utilized to create flexible containers for housing medical products that can be stored at room temperature.

Preferably, the gas barrier 16 is constructed from polyvinylidene chloride. It has been found that a polyvinylidene chloride manufactured by Dow Chemical and sold under the trademark "SARAN" functions satisfactorily. It should noted, however, that the gas barrier may be constructed from other materials, such as a hydrolyzed vinylacetate.

In a preferred embodiment, the web of film 10 has an overall thickness of approximately 0.005 inches to about 0.03 inches. It has been found that this thickness provides both sufficient strength and flexibility for the web of film 10.

Preferably, the first layer 12 and fifth layer 20 of the web of film 10 each have a thickness of approximately 0.0002 to about 0.0020 inches. Preferably, the second layer 14 and fourth layer 18 each have a thickness of approximately 0.0020 to about 0.0110 inches. Preferably, the gas barrier layer 16 has a thickness of approximately 0.0005 inches to about 0.004 inches. A gas barrier layer 16 having this thickness has been found to provide a sufficient gas and vapor barrier. Of course, by increasing the thickness of the gas barrier layer 16, the degree of transmission of vapor or gas across the layer can be further limited.

Although the outside layer, either the first or fifth layer, 12 or 20 respectively, depending on how the film is oriented, is constructed from a non-RF responsive material (a material that will not be heated to its softening temperature when exposed, alone, to RF energy between 25 and 30 MHz, due to the thicknesses and construction of the remaining portions of the film structure 10, the web of film can be sealed on typical packaging machinery utilizing RF energy. In this regard, the thickness of the polyvinyl chloride layers, 14 and 18 respectively, is sufficiently greater than that of the first layer and fifth layer 20 so that when RF energy is applied to the web of film 10, either the first or fifth layer, 12 or 20, will be softened by the energy. In this regard, reference is made to U.S. patent application Ser. No. 07/850,373, entitled: "RF ENERGY SEALABLE WEB OF FILM", filed herewith in the name of Larry Rosenbaum, which discloses a web of film that includes an outer layer of a non=RF responsive material that can be sealed by RF energy; the disclosure of which is incorporated herein by reference.

An advantage of the present invention is that except for perhaps the gas barrier layer 16, the remaining layers, 12, 14, 18, and 20, do not include a DEHP plasticizer. Furthermore, again except for perhaps the gas barrier layer 16, the remaining layers, 12, 14, 18, and 20, do not include epoxidized oils.

The web of film 10 of the present invention can be constructed through coextrusion. However, the web of film 10 also can be produced by other means, such as extrusion coating or lamination.

Figure 2:
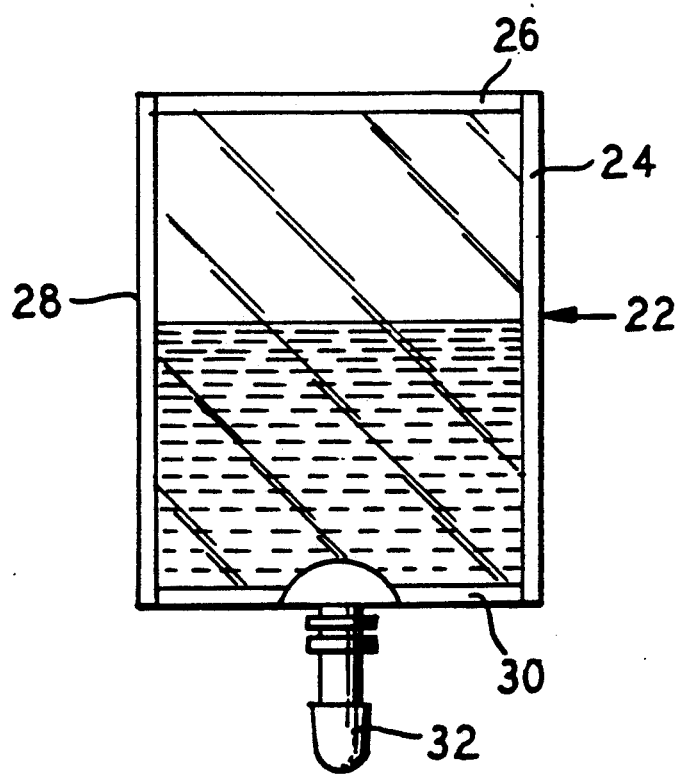
FIG. 2 illustrates a perspective view of a flexible container constructed from an embodiment of the web of film of the present invention.

Referring now to FIG. 2, a flexible container 22 constructed from the film 10 of the present invention is illustrated. As illustrated, the inside layer 12 of the film is sealed onto itself to create walls 24, 26, 28, and 30. Due to the construction of the inside layer 12, a strong seal is created, even if the film is RF welded.

Also, as illustrated, a fitment 32 can be sealed to the film 10 that defines the container 22. The fitment 32 can be utilized to access the interior of the container thereby providing means for accessing the contents of the container.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A web of film for producing flexible containers comprising:
    a first layer of polyester;
    a second layer of polyvinyl chloride that does not include a diethylhexylphthalate plasticizer or epoxidized oil;
    a third gas barrier layer of polyvinylidene chloride;
    a fourth layer of a polyvinyl chloride that does not include a plasticizer; and
    a fifth layer of polyester.

2. The web of film of claim 1 wherein the polyvinyl chloride layers include an ethylene-vinyl acetate copolymer as a plasticizer.

3. The web of film of claim 1 wherein the polyester layers include a polycyclohexanedimethylcyclohexane di-carboxylate elastomer.

4. The web of film of claim 1:
    the first layer has a thickness of approximately 0.0002 to about 0.0020 inches;
    the second layer has a thickness of approximately 0.0020 to about 0.0110 inches;
    the third layer has a thickness of approximately 0.0005 to about 0.004 inches;
    the fourth layer has a thickness of approximately 0.0020 to about 0.0110 inches; and
    the fifth layer has a thickness of approximately 0.0002 to about 0.0020 inches.

5. The web of film of claim 1 wherein the film has an overall thickness of approximately 0.005 inches to about 0.030 inches.

6. The web of film of claim 1 wherein the first, second, fourth, and fifth layers do not include epoxidized oil.

7. The web of film claim 1 wherein the gas barrier layer is polyvinylidene chloride.

8. A web of film for producing flexible medial containers comprising:
    a first layer of polyester;
    a second layer of polyvinyl chloride that does not include a diethylhexylphthalate plasticizer or epoxidized oil;
    a third gas barrier layer of polyvinylidene chloride;
    a fourth layer of polyvinyl chloride that does not include a diethylhexylphthalate plasticizer or epoxidized oil; and
    a fifth layer of polyester.

9. The web of film of claim 8 wherein the polyvinyl chloride layers include an ethylene-vinyl acetate copolymer as a plasticizer.

10. The web of film of claim 8 wherein the polyester layers include a polycyclohexanedimethylcyclohexane di-carboxylate elastomer.

11. The web of film of claim 8:
    the first layer has a thickness of approximately 0.00020 to about 0.0020 inches;
    the second layer has a thickness of approximately 0.0020 to about 0.0110 inches;
    the third layer has a thickness of approximately 0.0005 to about 0.004 inches:
    the fourth layer has a thickness of approximately 0.0020 to about 0.0110 inches; and
    the fifth layer has a thickness of approximately 0.00020 to about 0.0020 inches.

12. The web of film of claim 8 wherein the film has an overall thickness of approximately 0.005 inches to about 0.030 inches.

13. The web of film of claim 8 wherein the first, second, fourth, and fifth layers do not include epoxidized oil.

14. A flexible medical container having a body portion with opposed, sealed walls forming the container for containing fluids or solids that can be introduced into a patient body, the walls being constructed from a web of film comprising:
    a first layer of polyester;
    a second layer of polyvinyl chloride including an ethylene-vinyl acetate copolymer;
    a third layer of a material that provides a gas barrier;
    a fourth layer of a polyvinyl chloride including an ethylene-vinyl acetate copolymer; and
    a fifth layer of polyester.

15. The web of film of claim 14 wherein the polyester layers include a polycyclohexanedimethylcyclohexane di-carboxylate elastomer.

16. The web of film of claim 14:
    the first layer has a thickness of approximately 0.00020 to about 0.0020 inches;
    the second layer has a thickness of approximately 0.0020 to about 0.0110 inches;
    the third layer has a thickness of approximately 0.0005 to about 0.004 inches;
    the fourth layer has a thickness of approximately 0.0020 to about 0.0110 inches; and
    the fifth layer has a thickness of approximately 0.00020 to about 0.0020 inches.

17. The web of film of claim 14 wherein the film has an overall thickness of approximately 0.005 inches to about 0.030 inches.

18. The web of film of claim 14 wherein the first, second, fourth, and fifth layers do not include epoxidized oil.

19. The web of film of claim 14 wherein the material that provides a gas barrier is polyvinylidene chloride.

20. The flexible container of claim 14 including a fitment secured to a wall of the container providing a means for accessing the fluid or solid contained by the container.

* * * * *